(12) United States Patent
Choi et al.

(10) Patent No.: US 9,054,795 B2
(45) Date of Patent: Jun. 9, 2015

(54) SYSTEMS AND METHODS FOR PHASE NOISE MITIGATION

(71) Applicant: Kumu Networks, Inc., Santa Clara, CA (US)

(72) Inventors: Jung-Il Choi, Santa Clara, CA (US); Mayank Jain, Santa Clara, CA (US); Jeffrey Mehlman, Santa Clara, CA (US)

(73) Assignee: Kumu Networks, Inc., Santa Clara, CA (US)

(*) Notice: Subject to any disclaimer, the term of this patent is extended or adjusted under 35 U.S.C. 154(b) by 0 days.

(21) Appl. No.: 14/460,218

(22) Filed: Aug. 14, 2014

(65) Prior Publication Data

US 2015/0049834 A1 Feb. 19, 2015

Related U.S. Application Data

(60) Provisional application No. 61/865,943, filed on Aug. 14, 2013.

(51) Int. Cl.
*H04B 15/00* (2006.01)
*H04L 5/14* (2006.01)

(52) U.S. Cl.
CPC *H04B 15/00* (2013.01); *H04L 5/14* (2013.01); *H04B 1/525* (2013.01)

(58) Field of Classification Search
USPC .................. 375/285, 278, 296, 346, 350, 185
See application file for complete search history.

(56) References Cited

U.S. PATENT DOCUMENTS

| | | | |
|---|---|---|---|
| 4,952,193 A | 8/1990 | Talwar | |
| 5,212,827 A | 5/1993 | Meszko et al. | |
| 5,691,978 A | 11/1997 | Kenworthy | |
| 6,215,812 B1 | 4/2001 | Young et al. | |
| 6,317,583 B1 | 11/2001 | Wolcott et al. | |
| 6,567,649 B2 | 5/2003 | Souissi | |
| 6,639,551 B2 | 10/2003 | Li et al. | |
| 6,725,017 B2 | 4/2004 | Blount et al. | |
| 6,965,657 B1 | 11/2005 | Rezvani et al. | |
| 7,336,940 B2 | 2/2008 | Smithson | |
| 7,349,505 B2 | 3/2008 | Blount et al. | |
| 7,362,257 B2 | 4/2008 | Bruzzone et al. | |
| 7,426,242 B2 | 9/2008 | Thesling | |
| 7,869,527 B2 | 1/2011 | Vetter et al. | |
| 8,155,595 B2 | 4/2012 | Sahin et al. | |

(Continued)

FOREIGN PATENT DOCUMENTS

EP 0755141 B1 10/2005
EP 2267946 A2 12/2010

(Continued)

*Primary Examiner* — Kabir A Timory
(74) *Attorney, Agent, or Firm* — Jeffrey Schox; Thomas Gwinn

(57) ABSTRACT

A system for phase noise mitigated communication including a primary transmitter that converts a digital transmit signal to an analog transmit signal, a primary receiver that receives an analog receive signal and converts the analog receive signal to a digital receive signal, an analog self-interference canceller that samples the analog transmit signal, generates an analog self-interference cancellation signal based on the analog transmit signal, and combines the analog self-interference cancellation signal with the analog receive signal and a digital self-interference canceller that samples the digital transmit signal, generates a digital self-interference cancellation signal based on the digital transmit signal, and combines the digital self-interference cancellation signal with the digital receive signal.

21 Claims, 17 Drawing Sheets

(56) References Cited

U.S. PATENT DOCUMENTS

| | | |
|---|---|---|
| 8,175,535 B2 | 5/2012 | Mu |
| 8,179,990 B2 | 5/2012 | Orlik et al. |
| 8,218,697 B2 | 7/2012 | Guess et al. |
| 8,351,533 B2 | 1/2013 | Shrivastava et al. |
| 8,422,540 B1 | 4/2013 | Negus et al. |
| 2003/0031279 A1 | 2/2003 | Blount et al. |
| 2003/0099287 A1* | 5/2003 | Arambepola ............... 375/227 |
| 2004/0106381 A1 | 6/2004 | Tiller |
| 2005/0078743 A1 | 4/2005 | Shohara |
| 2005/0159128 A1 | 7/2005 | Collins et al. |
| 2005/0190870 A1 | 9/2005 | Blount et al. |
| 2005/0254555 A1 | 11/2005 | Teague |
| 2007/0018722 A1 | 1/2007 | Jaenecke |
| 2007/0274372 A1* | 11/2007 | Asai et al. ................. 375/130 |
| 2008/0107046 A1 | 5/2008 | Kangasmaa et al. |
| 2008/0219377 A1 | 9/2008 | Nisbet |
| 2009/0022089 A1 | 1/2009 | Rudrapatna |
| 2009/0034437 A1 | 2/2009 | Shin et al. |
| 2009/0180404 A1 | 7/2009 | Jung et al. |
| 2009/0186582 A1 | 7/2009 | Muhammad et al. |
| 2009/0325509 A1 | 12/2009 | Mattisson et al. |
| 2010/0022201 A1 | 1/2010 | Vandenameele |
| 2010/0117693 A1* | 5/2010 | Lorg et al. ................. 327/156 |
| 2010/0150033 A1 | 6/2010 | Zinser et al. |
| 2010/0159858 A1 | 6/2010 | Dent et al. |
| 2010/0232324 A1 | 9/2010 | Radunovic et al. |
| 2010/0279602 A1 | 11/2010 | Larsson et al. |
| 2010/0295716 A1* | 11/2010 | Yamaki et al. ............. 341/155 |
| 2011/0149714 A1 | 6/2011 | Rimini et al. |
| 2011/0216813 A1 | 9/2011 | Baldemair et al. |
| 2011/0222631 A1 | 9/2011 | Jong |
| 2011/0319044 A1 | 12/2011 | Bornazyan |
| 2012/0021153 A1 | 1/2012 | Bhandari et al. |
| 2012/0063369 A1 | 3/2012 | Lin et al. |
| 2012/0063373 A1 | 3/2012 | Chincholi et al. |
| 2012/0147790 A1 | 6/2012 | Khojastepour et al. |
| 2012/0154249 A1 | 6/2012 | Khojastepour et al. |
| 2012/0155335 A1 | 6/2012 | Khojastepour et al. |
| 2012/0155336 A1 | 6/2012 | Khojastepour et al. |
| 2012/0201153 A1 | 8/2012 | Bharadia et al. |
| 2012/0201173 A1 | 8/2012 | Jain et al. |
| 2013/0005284 A1 | 1/2013 | Dalipi |
| 2013/0044791 A1 | 2/2013 | Rimini et al. |
| 2013/0056270 A1 | 3/2013 | Ward |
| 2013/0089009 A1 | 4/2013 | Li et al. |
| 2013/0102254 A1 | 4/2013 | Cyzs et al. |
| 2013/0155913 A1 | 6/2013 | Sarca |
| 2013/0166259 A1 | 6/2013 | Weber et al. |
| 2013/0301487 A1 | 11/2013 | Khandani |
| 2013/0301488 A1 | 11/2013 | Hong et al. |
| 2014/0126437 A1 | 5/2014 | Patil et al. |
| 2014/0169236 A1 | 6/2014 | Choi et al. |
| 2014/0219139 A1 | 8/2014 | Choi et al. |

FOREIGN PATENT DOCUMENTS

| | | |
|---|---|---|
| WO | 2013056270 | 7/2013 |
| WO | 2013185106 A1 | 12/2013 |
| WO | 2014093916 A1 | 6/2014 |

* cited by examiner

SYSTEMS AND METHODS FOR PHASE NOISE MITIGATION

CROSS-REFERENCE TO RELATED APPLICATIONS

This application claims the benefit of U.S. Provisional Application Ser. No. 61/865,943, filed on 14 Aug. 2013, which is incorporated in its entirety by this reference.

TECHNICAL FIELD

This invention relates generally to the wireless communications field, and more specifically to new and useful systems and methods for phase noise mitigation.

BACKGROUND

Traditional wireless communication systems are half-duplex; that is, they are not capable of transmitting and receiving signals simultaneously on a single wireless communications channel. Recent work in the wireless communications field has led to advancements in developing full-duplex wireless communications systems; these systems, if implemented successfully, could provide enormous benefit to the wireless communications field. For example, the use of full-duplex communications by cellular networks could cut spectrum needs in half. One major roadblock to successful implementation of full-duplex communications is the problem of self-interference. While progress has been made in this area, many of the solutions intended to address self-interference are limited in performance by phase noise issues imparted by transceiver local oscillators (or other components). Thus, there is a need in the wireless communications field to create new and useful systems and methods for phase noise mitigation. This invention provides such new and useful systems and methods.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Full-Duplex Wireless Communication Systems

Wireless communications systems have revolutionized the way the world communicates, and the rapid growth of communication using such systems has provided increased economic and educational opportunity across all regions and industries. Unfortunately, the wireless spectrum required for communication is a finite resource, and the rapid growth in wireless communications has also made the availability of this resource a scarcer one. As a result, spectral efficiency has become increasingly important to wireless communications systems.

One promising solution for increasing spectral efficiency is found in full-duplex wireless communications systems; that is, wireless communications systems that are able to transmit and receive wireless signals at the same time on the same wireless channel. This technology allows for a doubling of spectral efficiency compared to standard half-duplex wireless communications systems.

While full-duplex wireless communications systems have substantial value to the wireless communications field, such systems have been known to face challenges due to self-interference; because reception and transmission occur at the same time on the same channel (or on channels close in frequency), the received signal at a full-duplex transceiver may include undesired signal components from the signal being transmitted from that transceiver. As a result, full-duplex wireless communications systems often include analog and/or digital self-interference cancellation circuits to reduce self-interference.

Full-duplex transceivers preferably sample transmission output as baseband digital signals or as radio-frequency (RF) analog signals, but full-duplex transceivers may additionally or alternatively sample transmission output in any suitable manner. This sampled transmission output may be used by analog and/or digital self-interference cancellation systems of full-duplex transceivers to remove interference from received wireless communications data. While this architecture is generally effective for reducing self-interference, the performance of self-interference cancellation systems may be limited by phase noise (or other noise) resulting from local oscillators and other components of a full-duplex transceiver. While the power of phase noise is typically substantially weaker than the power of the transmitted signal, it may be difficult to model, which in turn may limit the performance of self-interference cancellation based on the transmitted signal.

Figure 1:
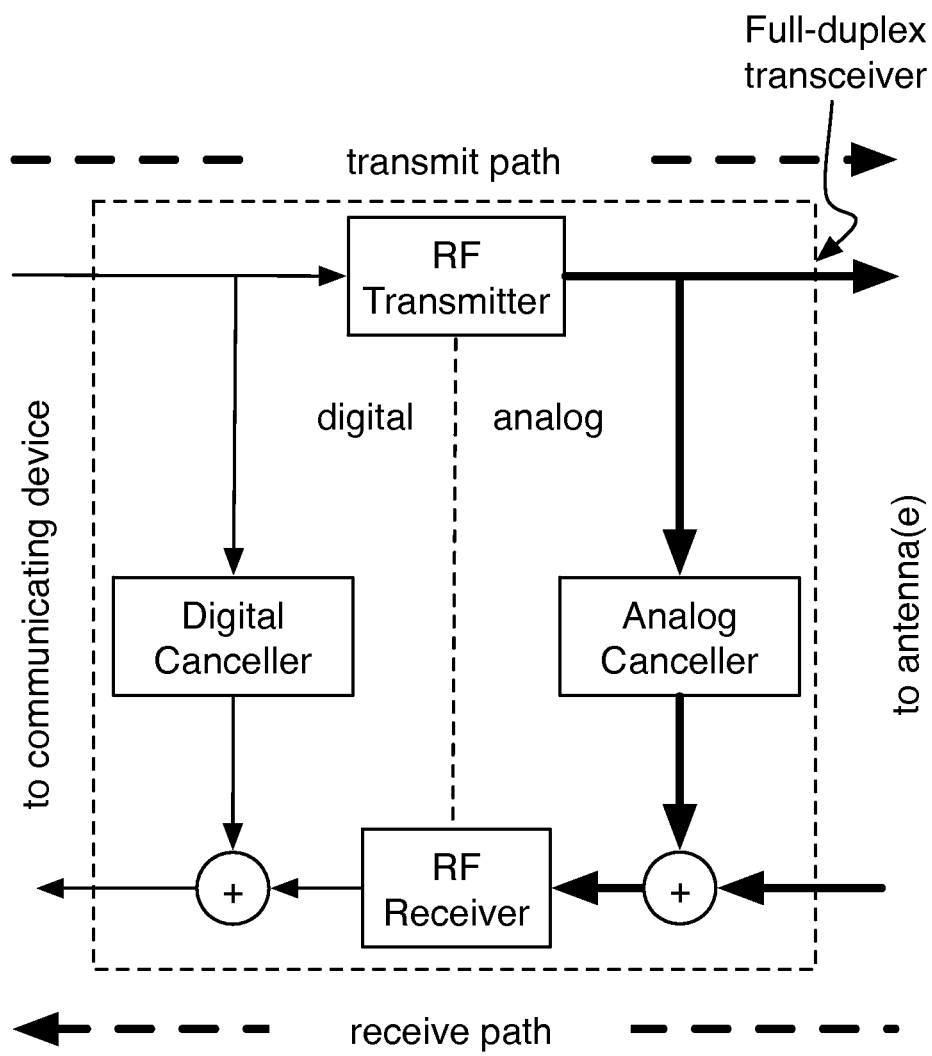
FIG. 1 is a diagram representation of full-duplex radio including digital and analog self-interference cancellation.

The systems and methods described herein increase the performance of full-duplex transceivers as shown in FIG. 1 (and other applicable systems) by increasing the effectiveness of self-interference cancellation by adapting for phase noise (or other noise) present in transmitted or received signals.

Other applicable systems include active sensing systems (e.g., RADAR), wired communications systems, wireless communications systems, and/or any other suitable system, including communications systems where transmit and receive bands are close in frequency, but not overlapping.

2. System for Phase Noise Mitigated Communication

Figure 2:
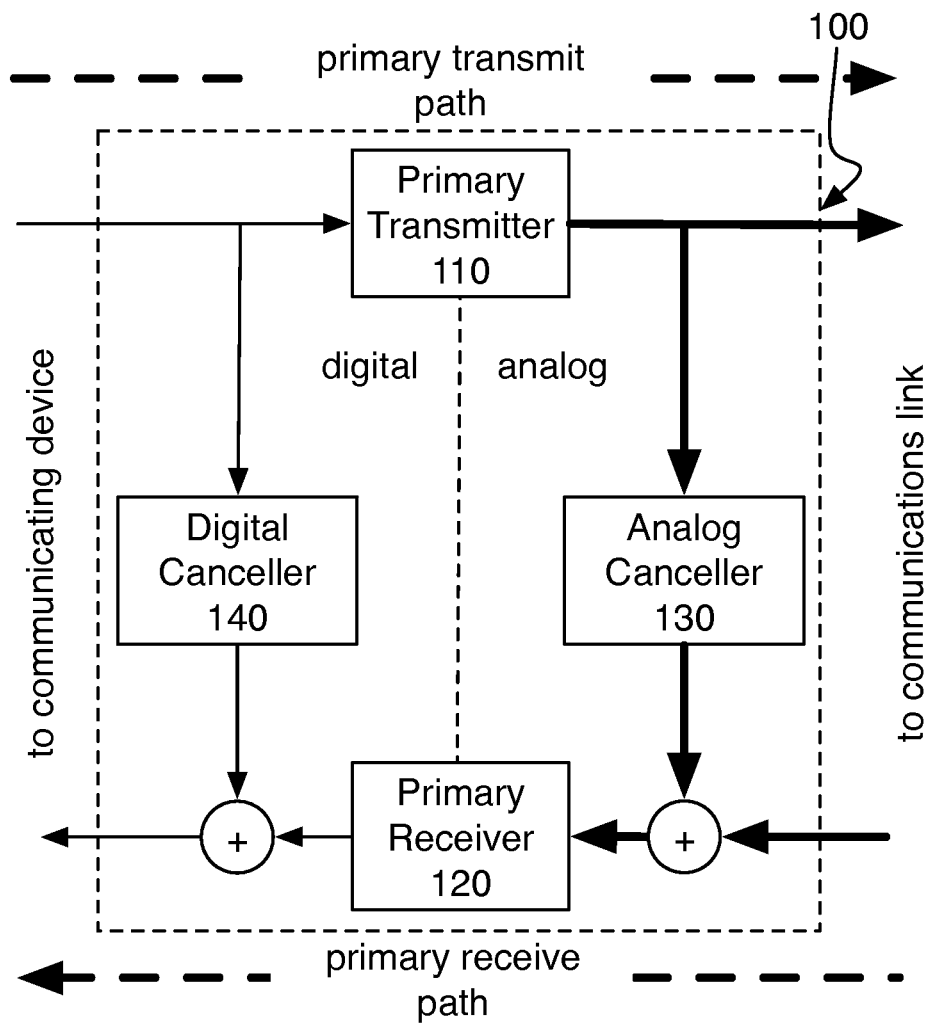
FIG. 2 is a diagram representation of a system of a preferred embodiment.

As shown in FIG. 2, a system 100 for phase noise mitigated communication includes a primary transmitter 110, a primary receiver 120, an analog self-interference canceller 130, and a digital self-interference canceller 140. The system 100 may additionally or alternatively include a secondary transmitter 115 and/or a secondary receiver 125. In a variation of a preferred embodiment, the system 100 may include only one of the analog and digital self-interference cancellers 130 and 140.

The system 100 is based on a self-interference cancelling communications system (e.g., a full-duplex transceiver), with the incorporation of modifications and/or additions designed to aid in phase noise mitigation. Specifically, implementations of the system 100 may incorporate one or more of the following elements designed to aid in phase noise mitigation: local oscillator sharing, embedded pilot measuring, secondary transmission, and secondary reception. The system 100 is preferably based on a full-duplex transceiver, but may additionally or alternatively be based on any other suitable communications system, including active sensing systems (e.g., RADAR), wired communications systems, wireless communications systems, and/or communications systems where transmit and receive bands are close in frequency, but not overlapping.

The system 100 is preferably implemented using both digital and analog circuitry. Digital circuitry is preferably implemented using a general-purpose processor, a digital signal processor, an application specific integrated circuit (ASIC), a field programmable gate array (FPGA) and/or any suitable processor(s) or circuit(s). Analog circuitry is preferably implemented using analog integrated circuits (ICs) but may additionally or alternatively be implemented using discrete components (e.g., capacitors, resistors, transistors), wires, transmission lines, waveguides, digital components, mixed-signal components, or any other suitable components. The system 100 preferably includes memory to store configuration data, but may additionally or alternatively be configured using externally stored configuration data or in any suitable manner.

The system 100 functions to enable communications between two communicating devices (e.g., computers or other electronic devices) over a communication link (e.g. wireless channel(s), optical fiber, coaxial cable, etc.). Wireless channels may include WiFi™ channels, LTE™ channels, or any other suitable wireless communications channels. The system 100 preferably converts digital data intended for transmission by a first communicating device to analog data at the primary transmitter 110, after which it can be transmitted to other communicating devices. The system 100 also preferably converts analog data, transmitted from other communicating devices to the first communicating device, to digital data at the primary receiver 120, after which it can be received by the first communicating device. In addition, the system 100 includes an analog self-interference canceller 130 and a digital self-interference canceller 140 that sample the signal transmitted by the first communicating device in order to remove self-interference present in the signal received by the first communicating device.

The primary transmitter 110 functions to convert digital transmit signals into analog transmit signals in order to prepare information for transmission over a communication link. The primary transmitter 110 is preferably coupled to a communications device on the digital side of the primary transmit path and the communications link on the analog side of the primary transmit path. The primary transmitter 110 is preferably a radio-frequency (RF) transmitter, but may additionally or alternatively be any suitable transmitter.

Figure 3A:
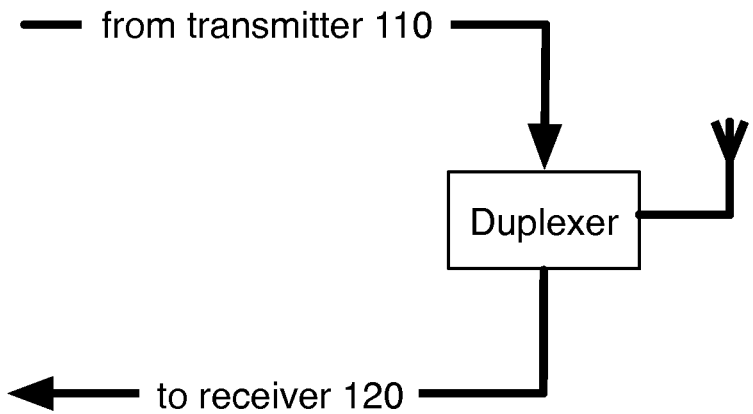
FIGS. 3A, 3B, and 3C are diagram representations of antenna couplings of a system of a preferred embodiment.
Figure 3B:
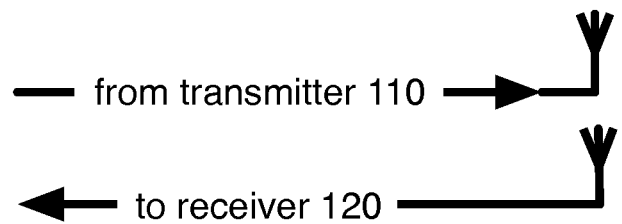
Figure 3C:
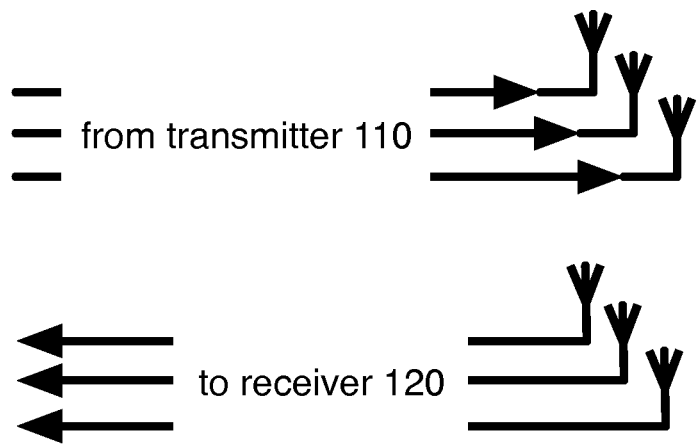

The primary transmitter no is preferably coupled to the communications link by a duplexer-coupled RF antenna as shown in FIG. 3A, but may additionally or alternatively be coupled to a communications link in any other suitable manner. Some examples of alternative couplings include coupling via a dedicated transmit antenna as shown in FIG. 3B, and coupling via multiple transmit antennas as shown in FIG. 3C.

Figure 4:
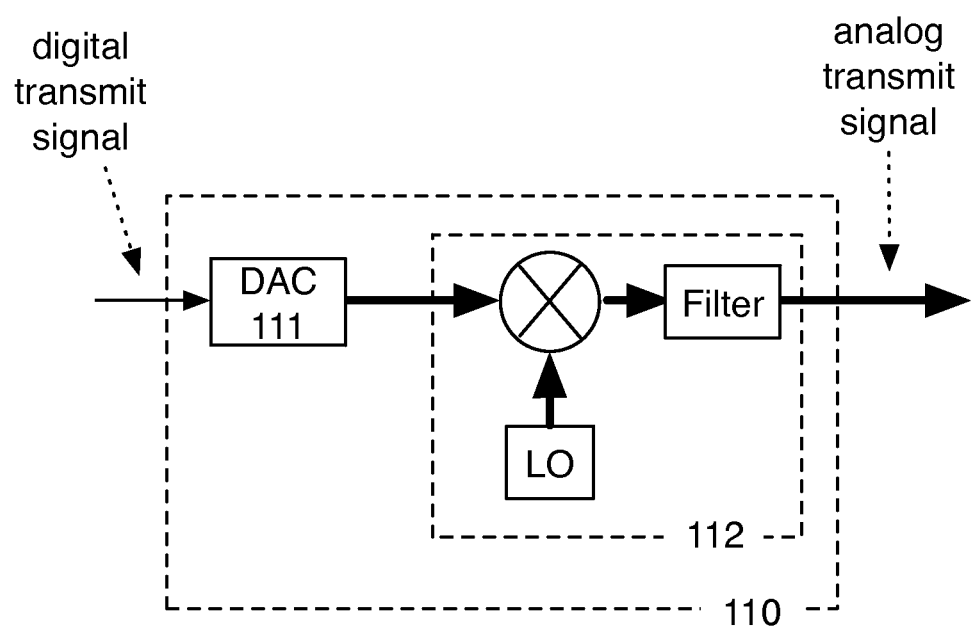
FIG. 4 is a schematic representation of a primary transmitter of a system of a preferred embodiment.

The primary transmitter no preferably includes a digital-to-analog converter (DAC) 111 and a frequency upconverter 112, as shown in FIG. 4. The primary transmitter 110 may additionally or alternatively include amplifiers, filters, signal processors and/or any other suitable components. The primary transmitter 110 may function to scale, shift, and/or otherwise modify the transmit signal. The digital-to-analog converter (DAC) 111 functions to convert the digital transmit signal to a baseband analog transmit signal, and the upconverter 112 functions to upconvert the baseband analog transmit signal from baseband to RF (or any other intended transmission frequency).

The DAC 111 may be any suitable digital-to-analog converter; e.g., a pulse-width modulator, an oversampling DAC, a binary-weighted DAC, an R-2R ladder DAC, a cyclic DAC, a thermometer-coded DAC, or a hybrid DAC.

The frequency upconverter 112 functions to upconvert the carrier frequency of the baseband analog transmit signal to a radio frequency, preparing it for transmission over the communications link. The upconverter 112 preferably accomplishes signal upconversion using heterodyning methods, but may additionally or alternatively use any suitable upconversion methods.

The upconverter 112 preferably includes a local oscillator (LO), a mixer, and an RF filter. The local oscillator functions to provide a frequency shift signal to the mixer; the mixer combines the frequency shift signal and the baseband analog transmit signal to create (usually two) frequency shifted signals, one of which is the RF analog transmit signal, and the RF filter rejects signals other than the RF analog transmit signal.

The local oscillator is preferably a digital crystal variable-frequency oscillator (VFO) but may additionally or alternatively be an analog VFO or any other suitable type of oscillator. The local oscillator preferably has a tunable oscillation frequency but may additionally or alternatively have a static oscillation frequency.

The mixer is preferably an active mixer, but may additionally or alternatively be a passive mixer. The mixer may comprise discrete components, analog ICs, digital ICs, and/or any other suitable components. The mixer preferably functions to combine two or more electrical input signals into one or more composite outputs, where each output includes some characteristics of at least two input signals.

The RF filter is preferably a bandpass filter centered around a tunable radio frequency. Additionally or alternatively, the RF filter may be a bandpass filter centered around a set radio frequency, or any other suitable type of filter. The RF filter is preferably a passive filter, but may additionally or alternatively be an active filter. The RF filter is preferably implemented with analog circuit components, but may additionally or alternatively be digitally implemented.

The primary receiver 120 functions to convert analog receive signals transmit signals into digital receive signals to allow received information to be processed by a connected communications device (e.g., a computer). The primary receiver 120 is preferably coupled to a communications device on the digital side of the primary receive path and the communications link on the analog side of the primary receive path. The primary receiver 120 is preferably a radio-frequency (RF) receiver, but may additionally or alternatively be any suitable receiver.

The primary receiver 120 is preferably coupled to the communications link by a duplexer-coupled RF antenna as shown in FIG. 3A, but may additionally or alternatively be coupled to a communications link in any other suitable manner. Some examples of alternative couplings include coupling via a dedicated receive antenna as shown in FIG. 3B, and coupling via multiple receive antennas as shown in FIG. 3C.

The receive signal received at the primary receiver 120 has preferably undergone analog self-interference cancellation; that is, the receive signal at the communications link is preferably combined with an analog self-interference cancellation signal before being received at the primary receiver 120.

Figure 5:
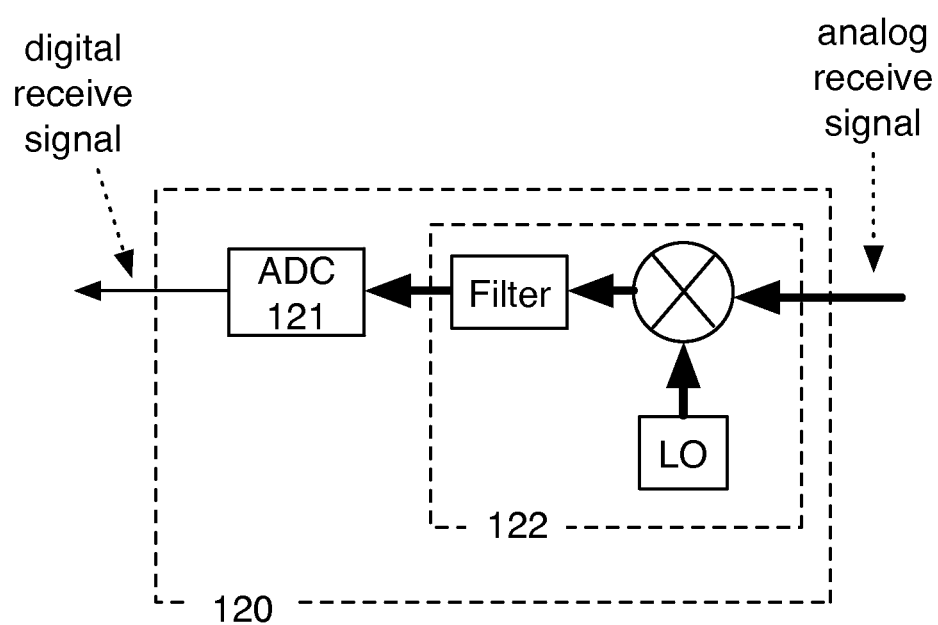
FIG. 5 is a schematic representation of a primary receiver of a system of a preferred embodiment.

The primary receiver 120 preferably includes an analog-to-digital converter (ADC) 121 and a frequency downconverter 122, as shown in FIG. 5. The primary receiver 120 may additionally or alternatively include amplifiers, filters, signal processors and/or any other suitable components. The primary receiver 120 may function to scale, shift, and/or otherwise modify the receive signal. The downconverter 122 functions to downconvert the analog receive signal from RF (or any other suitable frequency) to a baseband analog receive signal, and the analog-to-digital converter (ADC) 121 functions to convert the baseband analog receive signal to a digital receive signal.

The ADC 121 may be any suitable analog-to-digital converter; e.g., a direct-conversion ADC, a flash ADC, a successive-approximation ADC, a ramp-compare ADC, a Wilkinson ADC, an integrating ADC, a delta-encoded ADC, a time-interleaved ADC, or any other suitable type of ADC.

The frequency downconverter 122 functions to downconvert the carrier frequency of the analog receive signal to baseband, preparing it for conversion to a digital receive signal. The downconverter 122 preferably accomplishes signal downconversion using heterodyning methods, but may additionally or alternatively use any suitable upconversion methods.

The downconverter 122 preferably includes a local oscillator (LO), a mixer, and a baseband filter. The local oscillator functions to provide a frequency shift signal to the mixer; the mixer combines the frequency shift signal and the analog receive signal to create (usually two) frequency shifted signals, one of which is the baseband signal, and the baseband filter rejects signals other than the baseband analog receive signal.

The local oscillator is preferably a digital crystal variable-frequency oscillator (VFO) but may additionally or alternatively be an analog VFO or any other suitable type of oscillator. The local oscillator preferably has a tunable oscillation frequency but may additionally or alternatively have a static oscillation frequency.

The mixer is preferably an active mixer, but may additionally or alternatively be a passive mixer. The mixer may comprise discrete components, analog ICs, digital ICs, and/or any other suitable components. The mixer preferably functions to combine two or more electrical input signals into one or more composite outputs, where each output includes some characteristics of at least two input signals.

The baseband filter is preferably a lowpass filter with a tunable low-pass frequency. Additionally or alternatively, the baseband filter may be a lowpass filter with a set low-pass frequency, or any other suitable type of filter. The baseband filter is preferably a passive filter, but may additionally or alternatively be an active filter. The baseband filter is preferably implemented with analog circuit components, but may additionally or alternatively be digitally implemented.

The analog self-interference canceller 130 functions to reduce self-interference in the system 100 by canceling self-interference components present in analog receive signals of the system 100. The analog self-interference canceller 130 preferably reduces self-interference by sampling the analog transmit signal and generating an analog self-interference cancellation signal based on the input analog transmit signal. The analog self-interference cancellation signal is preferably combined with the analog receive signal before the analog receive signal reaches the primary receiver 120, but may additionally or alternatively be combined with the receive signal at any suitable location or time.

The analog self-interference canceller 130 is preferably implemented as an analog circuit that transforms an analog transmit signal into an analog self-interference cancellation signal by combining a set of filtered, scaled, and/or delayed versions of the analog transmit signal, but may additionally or alternatively be implemented as any suitable circuit. For instance, the analog self-interference canceller 130 may perform a transformation involving only a single version or copy of the analog transmit signal. The transformed signal (i.e. the analog self-interference cancellation signal) preferably represents at least a part of the self-interference component received at the coupling point of the system 100 to the communications link (e.g. a receive antenna).

The analog self-interference canceller 130 is preferably adaptable to changing self-interference parameters in addition to changes in the analog transmit signal; for example, transmitter temperature, ambient temperature, antenna configuration, humidity, and transmitter power. Adaptation of the analog self-interference canceller 130 is preferably performed by a control circuit or other control mechanism included in the canceller 130, but may additionally or alternatively be performed by any suitable controller.

The analog self-interference canceller 130 is preferably coupled to the primary transmit and receive paths by short section directional transmission line couplers, but may additionally or alternatively be coupled by any power dividers, power combiners, directional couplers, or other types of signal splitters suitable for coupling the primary transmit and receive paths of the system 100 to the analog self-interference canceller 130.

The digital self-interference canceller 140 functions to reduce self-interference in the system 100 by canceling self-interference components present in digital receive signals of the system 100. The digital self-interference canceller 140 preferably performs both linear and non-linear digital self-interference cancellation, but alternatively may only perform one of the two.

The digital self-interference canceller 140 preferably reduces digital self-interference by sampling the digital transmit signal and generating a digital self-interference cancellation signal based on the input sampled digital transmit signal (and a transform configuration). The digital self-interference cancellation signal is preferably combined with the digital receive signal after the primary receiver 120, but may additionally or alternatively be combined with the receive signal at any time or location. The digital self-interference canceller 140 preferably removes self-interference signal components not removed by the analog self-interference canceller 130.

The digital self-interference canceller 140 preferably samples the digital transmit signal of the system 100 (additionally or alternatively, the canceller 140 may sample the analog transmit signal or any other suitable transmit signal) and transforms the digital transmit signal to a digital self-interference cancellation signal based on a digital transform configuration. The digital transform configuration preferably includes settings that dictate how the digital self-interference canceller 140 transforms the digital transmit signal to a digital self-interference cancellation signal (e.g. coefficients of a generalized memory polynomial used to transform the transmit signal to a self-interference signal).

Phase Noise

As previously stated, the performance of self-interference cancellation systems may be limited by phase noise. Though power associated with phase noise is typically substantially lower (e.g., more than 30 dB lower in some situations) than the power associated with the transmit signal, phase noise may still play a major role in limiting the performance of self-interference cancellation systems; in many self-interference cancellation systems the self-interference signal component is much larger than the desired signal component (i.e., the part of the received signal not including self-interference, noise, etc.), so the power difference between the phase noise contained in the self-interference signal and the desired signal component may be much smaller than the 30 dB figure above. For example, if a phase noise component of a self-interference signal component is 30 dB below the self-interference signal power, but the desired signal component is 28 dB below the self-interference signal power, the phase noise component is only 2 dB below the desired signal component. Because phase noise contained within self-interference signals is often non-negligible compared to desired signal components, adapting for phase noise may provide substantial increases to the performance of self-interference cancellation systems.

The system 100 preferably incorporates at least one of the following elements designed to aid in phase noise mitigation: local oscillator sharing, embedded pilot measuring, secondary transmission, and secondary reception. The system 100 may additionally or alternatively incorporate multiple of these phase noise mitigation elements and/or any other suitable phase noise mitigation elements.

Local Oscillator Sharing

Local oscillator (LO) phase noise is often one of the major contributors to phase noise in communications systems. Local oscillators are typically used in mixers and frequency changing components common in many communications systems; in particular, local oscillators may be present in the upconverter 112 and downconverter 122. Local oscillators contribute phase noise to the system 100 whenever they drift from their intended oscillation frequency; in other words, local oscillator phase noise results from a change in LO frequency $f_c \to f_c + \Delta_f$ where $\Delta_f$ represents a time-variant change in frequency. The properties of this frequency change may be difficult to model in either the analog or digital self-interference cancellers.

Figure 6:
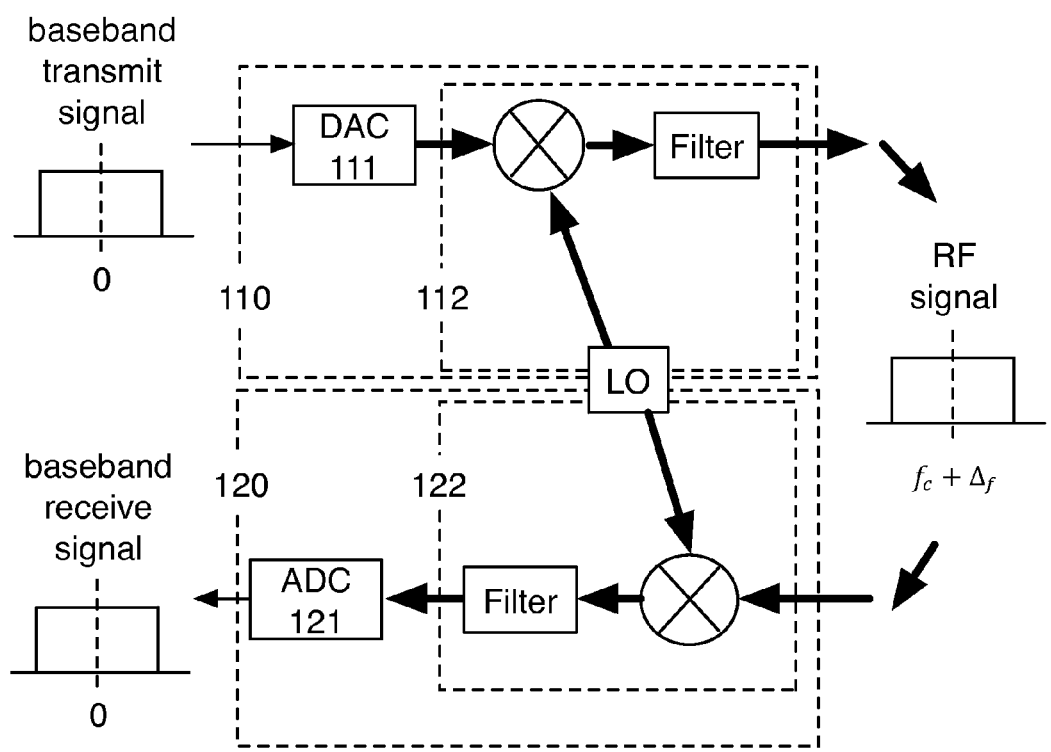
FIG. 6 is a schematic representation of LO sharing of a system of a preferred embodiment.

For full-duplex communication systems, the local oscillators of the upconverter 112 and downconverter 122 preferably operate at the same frequency (since the analog transmit and receive signals are at the same frequency). Local oscillator sharing can be used for these systems (and any other systems where multiple local oscillators operate at the same frequency) to reduce the presence of phase noise in the received self-interference signal. That is, if the upconverter 112 and downconverter 122 use the same local oscillator, as shown in FIG. 6, much of the phase noise effect added during the upconversion of the transmitted signal by the local oscillator will be removed during downconversion of the received signal.

Embedded Pilot Measuring

Many transmitted signals include embedded pilots (e.g. pilot signals, pilot carriers, pilot symbols, pilot tones). Embedded pilots may be contained within signal preambles or signals themselves. Embedded pilots serve as reference signals with known signal content (for example, a pilot signal might be a single-frequency sine wave). By comparing received embedded pilots to known information about those pilots, phase noise (and other information) may be determined.

Figure 7:
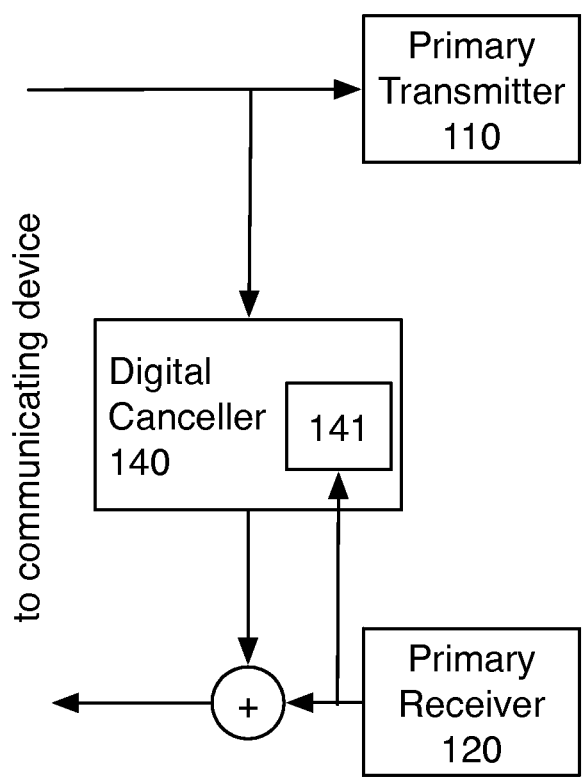
FIG. 7 is a schematic representation of an embedded pilot analyzer of a system of a preferred embodiment.

In one implementation of a preferred embodiment, the digital self-interference canceller 140 includes an embedded pilot analyzer 141, as shown in FIG. 7. The embedded pilot analyzer 141 functions to detect embedded pilots and compare them to reference information to determine phase noise data. The embedded pilot analyzer 141 preferably takes the digital receive signal as input but may additionally or alternatively receive any input containing embedded pilots.

The embedded pilot analyzer 141 may additionally or alternatively alter the transform configuration of the digital canceller 140 based on phase noise data collected from pilot analysis. For example, if the embedded pilot analyzer 141 determines that a pilot signal is offset by a frequency shift $\Delta_f$, the embedded pilot analyzer 141 may modify the transform configuration of the digital canceller 140 to account for the frequency shift.

Secondary Transmission

Figure 8:
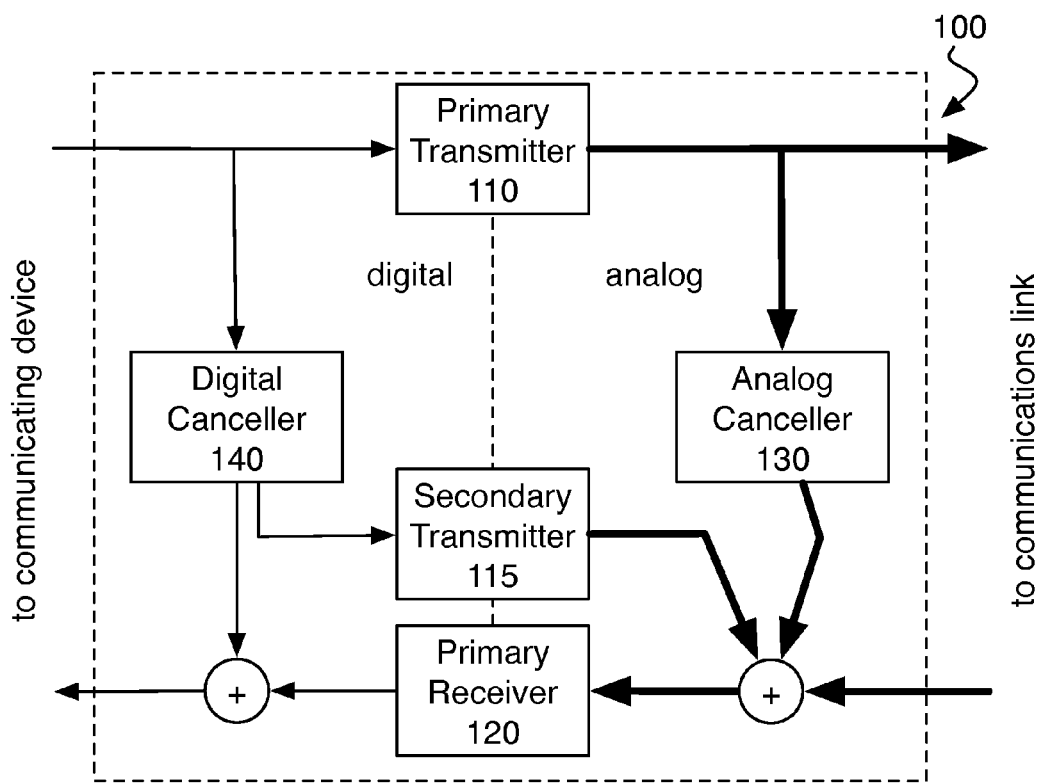
FIG. 8 is a schematic representation of a system of a preferred embodiment.

In one implementation of a preferred embodiment, the system 100 includes a secondary transmitter 115, as shown in FIG. 8. The secondary transmitter 115 is preferably coupled between an output of the digital canceller 140 and the analog receive line. The secondary transmitter 115 functions to allow some of the digital self-interference cancellation performed by the digital self-interference canceller 140 to be applied to the analog receive signal before the analog receive signal is converted by the primary receiver 120. The digital self-interference signal component added to the analog receiver signal by the secondary transmitter 115 is hereafter referred to a digitally sourced analog self-interference cancellation signal or DSA self-interference cancellation signal. Performing some of the digital self-interference cancellation in the analog domain has a number of benefits; one of which is that the dynamic range requirements of the ADC 121 may be reduced, allowing for the use of less expensive components and/or increasing signal-to-noise ratio for existing components.

Additionally, the digital self-interference cancellation signal, the DSA self-interference cancellation signal, and the analog self-interference cancellation signal may work in concert to increase performance of self-interference cancellation. For example, the analog self-interference canceller 130 may be used to cancel a first (high-powered) portion of the received self-interference signal, while the digital self-interference canceller 140 may be used to produce a DSA self-interference cancellation signal to cancel a second portion of the received self-interference signal (which may correspond to non-linear/higher order self-interference) and also to produce a digital self-interference cancellation signal to cancel a third portion of the received self-interference signal (corresponding to any residual self-interference present in the received signal). The digital self-interference cancellation signal may, in some cases, be used to cancel contributions to the self-interference signal contributed by the primary receiver 120.

The digital and DSA self-interference cancellation signals may share an identical digital source (i.e. the output of the digital self-interference canceller 140 may be identical for both signal paths), but additionally or alternatively the digital and DSA self-interference cancellation signals may have distinct digital sources. The transform configuration of the digital self-interference canceller 140 is preferably used to determine the digital source for each signal; additionally or alternatively, the digital source of each signal is determined by another suitable controller or processor.

Figure 9:
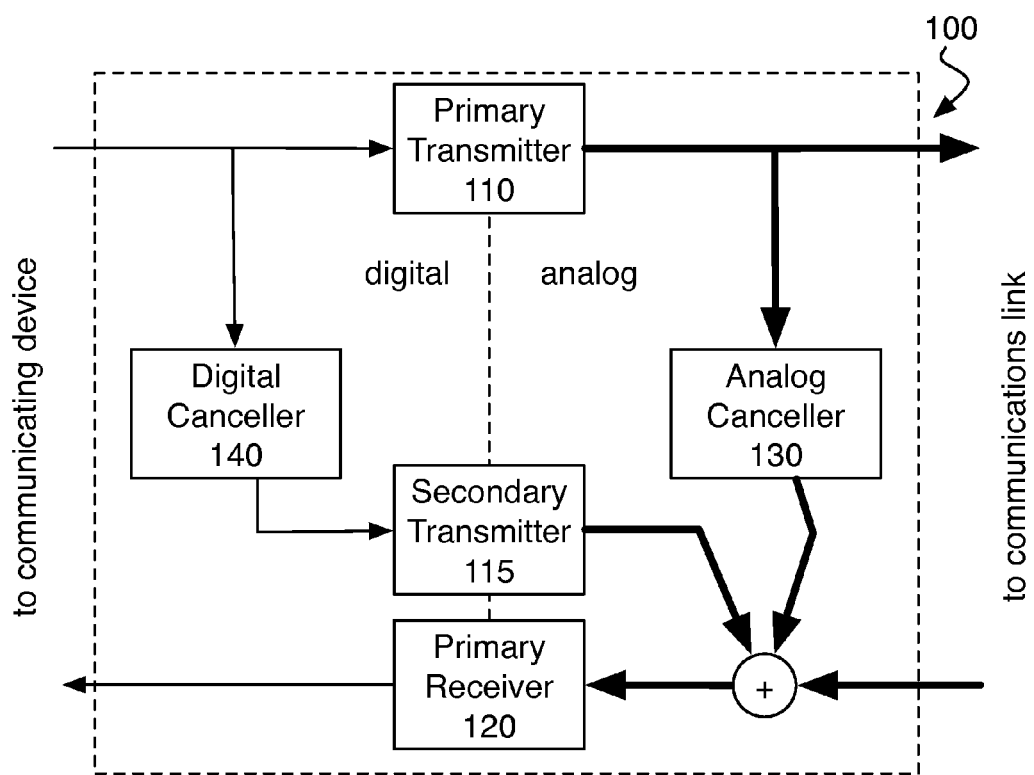
FIG. 9 is a schematic representation of a system of a preferred embodiment.

In one variation of the preferred embodiment, the digital self-interference canceller only produces a DSA self-interference cancellation signal, as shown in FIG. 9.

Figure 10:
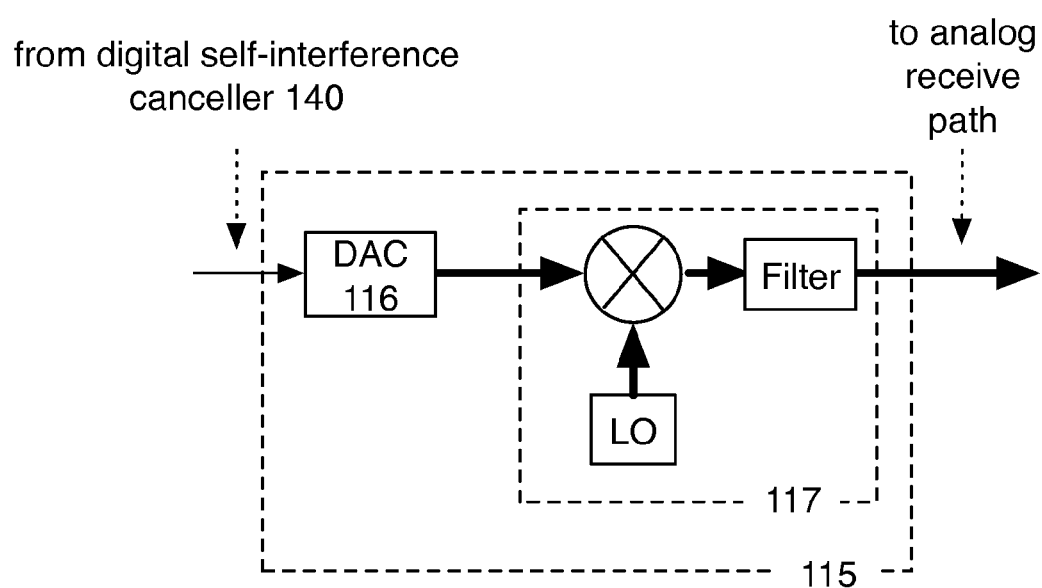
FIG. 10 is a schematic representation of a secondary transmitter of a system of a preferred embodiment.

The secondary transmitter 115 is preferably substantially similar to the primary transmitter 110, but may additionally or alternatively be any suitable transmitter. The secondary transmitter 115 preferably includes a digital-to-analog converter (DAC) 116 and a frequency upconverter 117, as shown in FIG. 10. The DAC 116 and upconverter 117 are preferably substantially similar to the DAC 111 and frequency upconverter 112, but may additionally or alternatively be any suitable DAC and frequency upconverter. The secondary transmitter 115 may additionally or alternatively include amplifiers, filters, signal processors and/or any other suitable components. The secondary transmitter 115 may function to scale, shift, and/or otherwise modify the transmit signal.

In one implementation of a preferred embodiment, the upconverter 112, upconverter 117, and downconverter 122 all share the same local oscillator. As described in the section on LO sharing, this may help to further decrease phase noise present in the self-interference signal received by the system 100.

Secondary Reception

Figure 11:
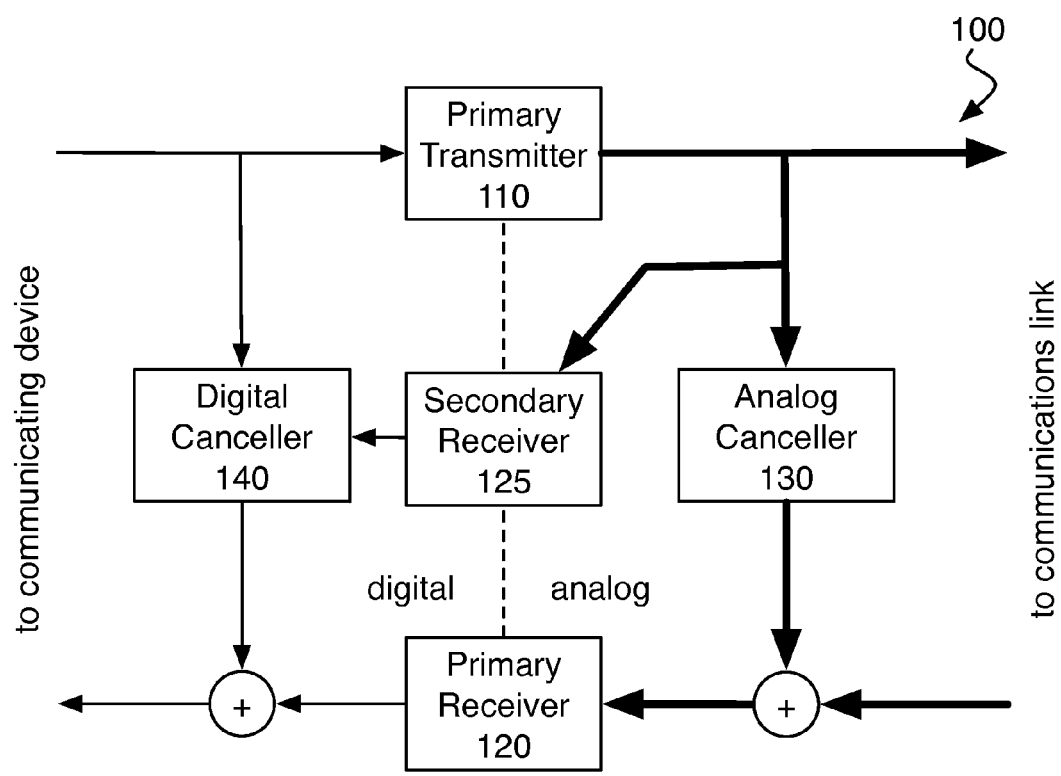
FIG. 11 is a schematic representation of a system of a preferred embodiment.

In one implementation of a preferred embodiment, the system 100 includes a secondary receiver 125, as shown in FIG. 11. The secondary receiver 125 is preferably coupled between the analog transmit signal path and an input to the digital self-interference canceller 140, but may additionally or alternatively may be coupled to the system 100 in any suitable manner.

Figure 12:
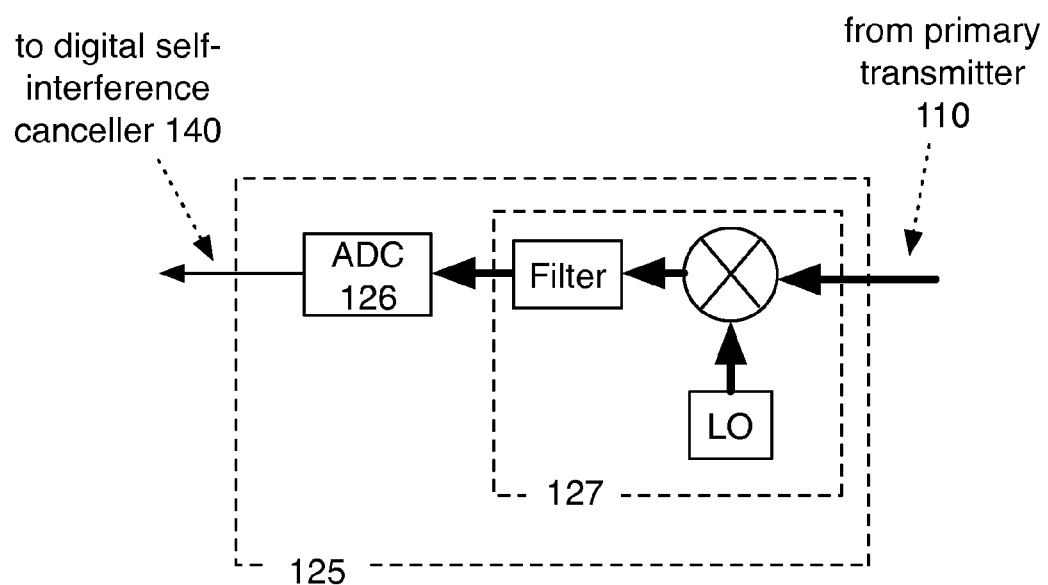
FIG. 12 is a schematic representation of a secondary receiver of a system of a preferred embodiment.

The secondary receiver 125 is preferably substantially similar to the primary receiver 120, but may additionally or alternatively be any suitable receiver. The secondary receiver 125 preferably includes an analog-to-digital converter (ADC) 126 and a frequency downconverter 127, as shown in FIG. 12. The ADC 126 and downconverter 127 are preferably substantially similar to the ADC 121 and frequency downconverter 122, but may additionally or alternatively be any suitable ADC and frequency downconverter. The secondary receiver 125 may additionally or alternatively include amplifiers, filters, signal processors and/or any other suitable components. The secondary receiver 125 may function to scale, shift, and/or otherwise modify the receive signal.

The primary receiver 120 and secondary receiver 125 preferably share the same local oscillator, but additionally or alternatively may have different local oscillators.

The secondary receiver 125 is preferably used when the self-interference cancellation is applied across bands; that is, the transmit and receive frequencies of the system 100 are different. In this situation, it is not possible to use the same local oscillator for transmitters as for receivers (because the oscillation frequency required to convert to baseband is different). As a result, carrier frequency offsets (e.g., $f_1 = f_{c1} + \Delta f_1$, $f_2 = f_{c2} + \Delta f_2$) may result in increased phase noise in the system 100.

Given this situation, the secondary receiver 125 is preferably used to aid in the cancellation of phase noise resulting from carrier frequency offsets as well as amplifier noise. Both the signal received at the secondary receiver 125 and the primary receiver 120 contain phase noise and transmitter noise from the primary transmitter 110, but distortion of the signal received at the primary receiver 125 also includes distortion due to the communications link coupler (e.g., the duplexer and antenna, or the separated TX/Rx antennas, etc.). Thus, the analog self-interference canceller 130 can be designed or tuned to focus on the reduction of distortion caused by the communications link/communications link coupler, while the digital self-interference canceller (though input of the secondary receiver 125) may be designed to reduce distortion caused by carrier offset and/or amplifier noise (in addition to other digital self-interference cancellation, e.g. non-linear self-interference signal components). The analog self-interference canceller 130 preferably samples the analog transmit signal to produce an analog-sourced digital signal; this analog-sourced digital signal is preferably used as input by the digital self-interference canceller 140 for producing the digital self-interference cancellation signal.

The secondary receiver 125 may additionally or alternatively be used when the transmit and receive frequencies of the system 100 are the same. In this situation, the use of the secondary receiver 125 may reduce the complexity required in modeling non-linear self-interference signal contributions resulting from the non-linear behavior of power amplifiers of the primary transmitter 110.

3. System for Phase Noise Mitigated MIMO Communication

A system 200 for phase noise mitigated multiple-in multiple-out (MIMO) communication is an implementation of the system 100 modified for MIMO communications as described herein. MIMO technology may offer increased data throughput and link range without the need for additional bandwidth or increased transmitter power; additionally, MIMO communications systems featuring self-interference cancellation may make use of many of the same self-interference cancellation technologies used by traditional communications systems.

Figure 13:
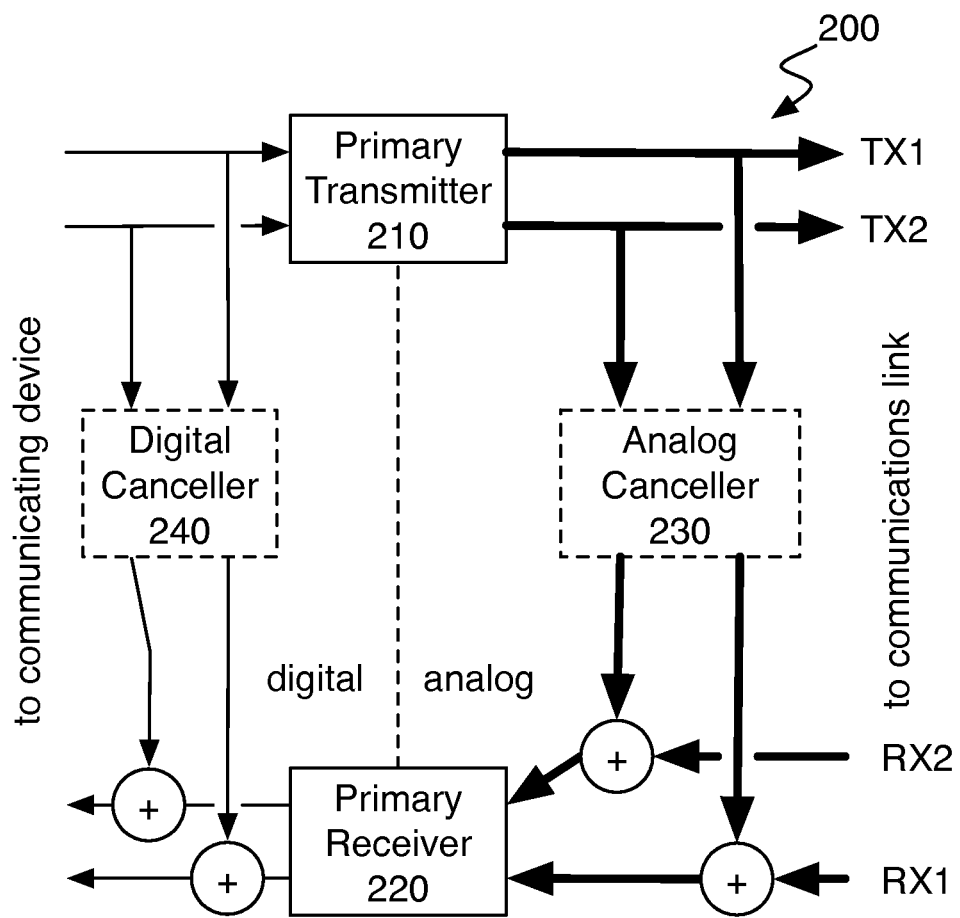
FIG. 13 is a schematic representation of a system of a preferred embodiment.

As shown in FIG. 13, a system 200 for phase noise mitigated MIMO communication includes a primary transmitter 210 and a primary receiver 220. The system 100 may additionally or alternatively include an analog self-interference canceller 230, a digital self-interference canceller 240, a secondary transmitter 215 and/or a secondary receiver 225.

The system 200 may be a 2×2 MIMO system as shown in FIG. 13, but may additionally have any suitable number of transmit and receive signal paths. Each signal path may have separate antennas; alternatively, signal paths may share antennas via a duplexer or other coupler. In one example, a 2×2 MIMO system has four antennas: a TX1 antenna, a TX2 antenna, an RX1 antenna, and an RX2 antenna. In another example, a 2×2 MIMO system has two antennas: a TX1/RX1 antenna (coupled to both TX1 and RX1 signal paths via a duplexer) and a TX2/RX2 antenna (coupled to both TX2 and RX2 signal paths via a duplexer).

Figure 14A:
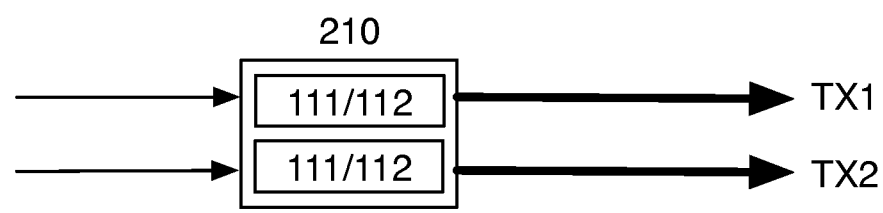
FIG. 14A is a schematic representation of a primary transmitter of a system of a preferred embodiment.

As shown in FIG. 14A, the primary transmitter 210 is preferably an implementation of the primary transmitter 110 having multiple inputs and outputs. In particular, the primary transmitter 210 preferable includes a DAC and frequency upconverter for each transmit signal path; additionally or alternatively, transmit signal paths may share DACs and/or frequency upconverters. Additionally or alternatively, the primary transmitter 210 may be any suitable MIMO transmitter; for example, the primary transmitter 210 may include MIMO signal splitting or processing circuitry (which may be used to process a single digital signal into multiple MIMO analog signals).

Figure 14B:
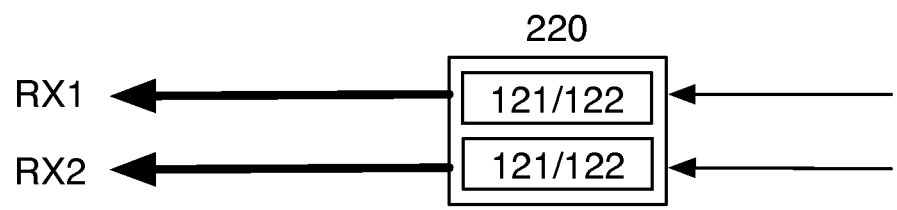
FIG. 14B is a schematic representation of a primary receive of a system of a preferred embodiment.

As shown in FIG. 14B, the primary receiver 220 is preferably an implementation of the primary receiver 120 wherein the primary receiver 120 having multiple inputs and outputs. In particular, the primary receiver 220 preferable includes an ADC and frequency downconverter for each receive signal path; additionally or alternatively, receive signal paths may share ADCs and/or frequency downconverters. Additionally or alternatively, the primary transmitter 210 may be any suitable MIMO transmitter; for example, the primary transmitter 210 may include MIMO signal splitting or processing circuitry (which may be used to process a single digital signal into multiple MIMO analog signals).

The analog self-interference canceller 230, like the analog self-interference canceller 130, functions to cancel self-interference present in receive signals (caused by transmit signals). The analog self-interference canceller 230 is in particular specifically designed for MIMO operating environments (i.e., multiple transmit and/or receive signals). In MIMO operating environments, self-interference may occur across communications streams in addition to in them; for example, a TX1 signal may cause interference in both of RX1 and RX2 signals.

The analog self-interference canceller 230 preferably includes a set of analog self-interference sub-cancellers (ASISs) 231. Each ASIS 231 is preferably substantially similar to an analog self-interference canceller 130, but may additionally or alternatively be any suitable analog self-interference cancellation system.

Figure 15:
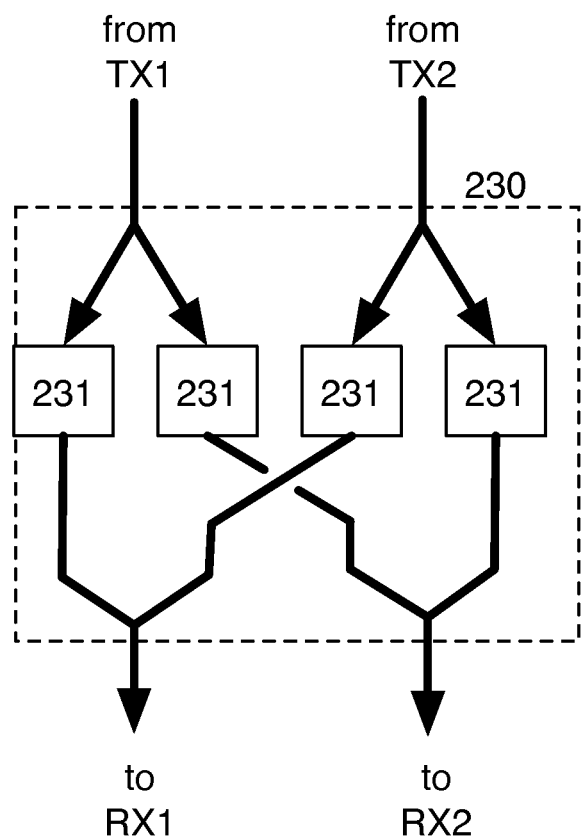
FIG. 15 is a schematic representation of an analog self-interference canceller of a system of a preferred embodiment.

In one implementation of a preferred embodiment, the analog self-interference canceller 230 includes ASISs 231 for RX/TX pairings (e.g., RX1/TX1, RX1/TX2, etc.) as shown in FIG. 15. In this implementation, each ASIS 231 functions to remove self-interference resulting from a particular pairing; e.g., an RX1/TX2 ASIS 231 functions to remove self-interference in the RX1 receive signal resulting from the TX2 transmit signal.

Figure 16:
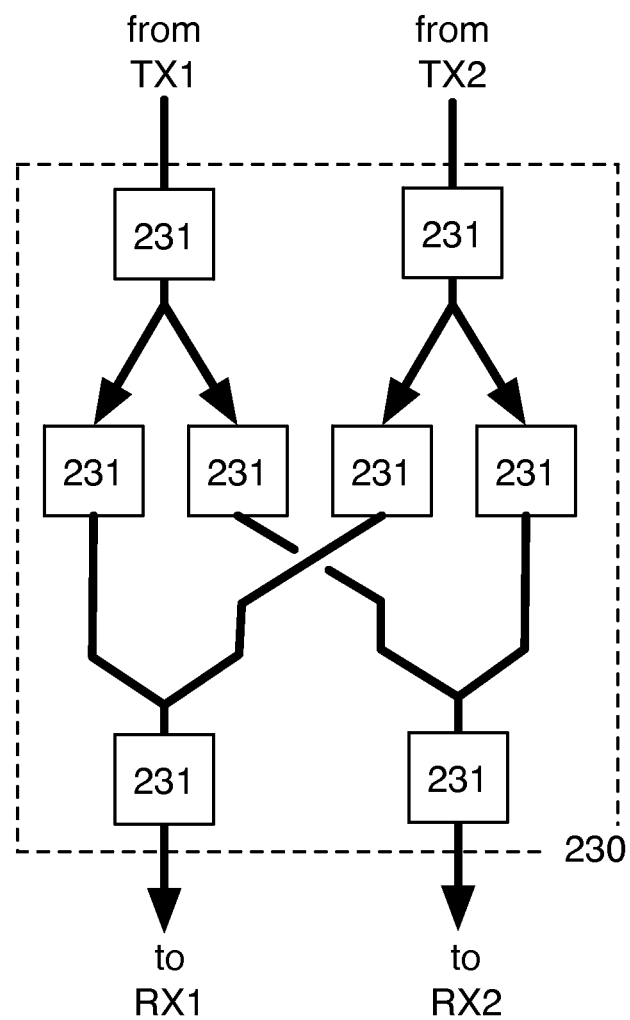
FIG. 16 is a schematic representation of an analog self-interference canceller of a system of a preferred embodiment.
Figure 17:
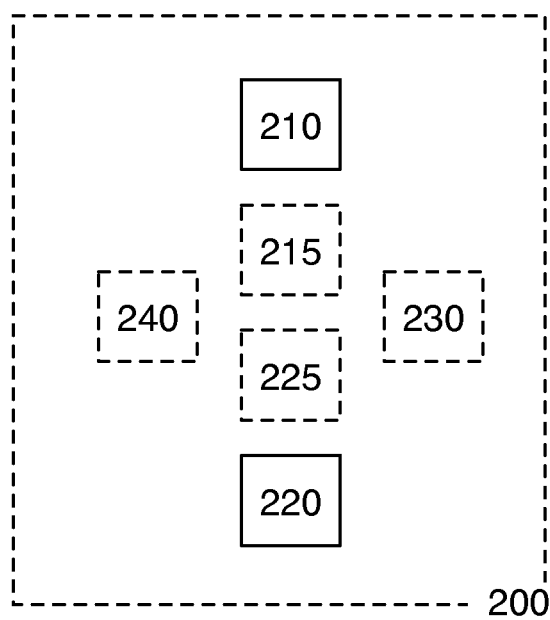
FIG. 17 is a schematic representation of a system of a preferred embodiment.

In another implementation of a preferred embodiment, the analog self-interference canceller 230 conceptually splits the duties of self-interference reduction for each stream pairing into transmitter contributions, channel contributions, and receiver contributions. In this implementation, ASISs 231 are provided for transmit streams, receive streams, and stream pairings, as shown in FIG. 16. ASISs 231 for transmit streams preferably remove self-interference contributions common to a particular transmitter across streams; ASISs 231 for receive streams preferably remove self-interference contributions common to a particular receiver across streams; and ASISs 231 for stream pairings preferably remove self-interference contributions unique to that particular stream pairing. Dividing self-interference cancellation duties in this way may significantly reduce hardware costs of the analog self-interference canceller 230 by preventing unnecessary duplication of function (e.g., by preventing each pairing of an RX stream with TX1 from duplicating self-interference contributions common to all pairings with TX1).

The digital self-interference canceller 24o is preferably substantially similar to the digital self-interference canceller 140. The digital self-interference canceller may perform digital self-interference cancellation on each MIMO digital receive signal as shown in FIG. 13, but may additionally or alternatively perform digital self-interference cancellation on a combined digital receive signal (resulting from the combination of MIMO digital receive signals). If the digital self-interference canceller 240 performs self-interference cancellation for multiple MIMO digital receive signals, cancellation may be performed for each TX/RX pairing, similarly to those described in the section on the analog self-interference canceller 230.

A person of ordinary skill in the art will note that the previously described LO sharing and embedded pilot measuring implementations are also compatible with the system 200. For the system 200, the embedded pilot measuring implementation may be performed for any analog transmit signal of the system 200.

Likewise, secondary transmitters 215 and secondary receivers 225 are preferably substantially similar to the secondary transmitter 115 and secondary receiver 125 respectively and may be implemented as described in the system 100 description for each TX/RX signal pair of the system 200.

The methods of the preferred embodiment and variations thereof can be embodied and/or implemented at least in part as a machine configured to receive a computer-readable medium storing computer-readable instructions. The instructions are preferably executed by computer-executable components preferably integrated with a full-duplex communications system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A system for phase noise mitigated communication comprising:
   a primary transmitter, coupled to a digital transmit path of an electronic device, that converts a digital transmit signal received via the digital transmit path to an analog transmit signal, and transmits the analog transmit signal via an analog transmit path;
   a primary receiver, coupled to a digital receive path of the electronic device, that receives an analog receive signal via an analog receive path, and converts the analog receive signal to a digital receive signal;
   an analog self-interference canceller, coupled to the analog receive path and the analog transmit path; wherein the analog self-interference canceller samples the analog transmit signal, generates an analog self-interference cancellation signal based on the analog transmit signal, and combines the analog self-interference cancellation signal with the analog receive signal; and
   a digital self-interference canceller, coupled to the digital transmit path and the digital receive path; wherein the digital self-interference canceller samples the digital transmit signal, generates a digital self-interference cancellation signal based on the digital transmit signal, and combines the digital self-interference cancellation signal with the digital receive signal; and
   a secondary receiver coupled to the analog transmit signal path and coupled to an input of the digital self-interference canceller; wherein the secondary receiver samples the analog transmit signal to produce and analog sourced digital signal;

wherein the digital self-interference canceller generates the digital self-interference cancellation signal based on the digital transmit signal and the analog-sourced digital signal.

2. The system of claim 1, wherein the primary receiver is an RF wireless receiver and the primary transmitter is an RF wireless transmitter.

3. The system of claim 1, wherein the primary transmitter comprises a digital-to-analog converter and a frequency upconverter; wherein the primary receiver comprises an analog-to-digital converter and a frequency downconverter; wherein the frequency upconverter and the frequency downconverter share a local oscillator.

4. The system of claim 1, wherein the analog self-interference canceller generates the analog self-interference cancellation signal by combining filtered, scaled, and delayed versions of the analog transmit signal.

5. The system of claim 1, wherein the digital self-interference canceller generates the digital self-interference cancellation signal according to a digital transform configuration.

6. The system of claim 5, wherein the digital self-interference canceller further comprises an embedded pilot analyzer that detects an embedded pilot in the digital receive signal and analyzes the embedded pilot to determine phase noise data; wherein the digital self-interference canceller adapts the digital transform configuration based on the phase noise data.

7. The system of claim 1, wherein the digital self-interference canceller further comprises an embedded pilot analyzer that detects an embedded pilot in the digital receive signal and analyzes the embedded pilot to determine phase noise data.

8. The system of claim 1, further comprising a secondary transmitter coupled to an output of the digital self-interference canceller and to the analog receive path; wherein the secondary transmitter converts an output of the digital self-interference canceller to a digitally sourced analog self-interference cancellation signal and combines the digitally sourced analog self-interference cancellation signal with the analog receive signal.

9. The system of claim 8, wherein the output is the digital self-interference cancellation signal.

10. The system of claim 8, wherein the primary transmitter, the secondary transmitter, and the primary receiver share a local oscillator.

11. The system of claim 10, further comprising a secondary receiver coupled to the analog transmit signal path and coupled to an input to the digital self-interference canceller; wherein the secondary receiver samples the analog transmit signal to produce an analog-sourced digital signal.

12. The system of claim 1, wherein the analog transmit signal and the analog receive signal have different carrier frequencies; wherein the primary receiver and the secondary receiver share a local oscillator.

13. A system for phase noise mitigated communication comprising:
a primary transmitter, coupled to a digital transmit path of an electronic device, that converts a digital transmit signal received via the digital transmit path to an analog transmit signal, and transmits the analog transmit signal via an analog transmit path;
a primary receiver, coupled to a digital receive path of the electronic device, that receives an analog receive signal via an analog receive path, and converts the analog receive signal to a digital receive signal; and
a digital self-interference canceller, coupled to the digital transmit path and the digital receive path; wherein the digital self-interference canceller samples the digital transmit signal, generates a digital self-interference cancellation signal based on the digital transmit signal, and combines the digital self-interference cancellation signal with the digital receive signal; and
a secondary receiver coupled to the analog transmit signal path and coupled to an input of the digital self-interference canceller; wherein the secondary receiver samples the analog transmit signal to produce an analog-sourced digital signal;
wherein the primary transmitter and the primary receiver share a local oscillator;
wherein the digital self-interference canceller generates the digital self-interference cancellation signal based on the digital transmit signal and the analog-sourced digital signal.

14. The system of claim 13, wherein the primary receiver is an RF wireless receiver and the primary transmitter is an RF wireless transmitter.

15. The system of claim 13, wherein the primary transmitter comprises a digital-to-analog converter and a frequency upconverter; wherein the primary receiver comprises an analog-to-digital converter and a frequency downconverter; wherein the frequency upconverter and the frequency downconverter share a local oscillator.

16. The system of claim 13, wherein the digital self-interference canceller generates the digital self-interference cancellation signal according to a digital transform configuration.

17. The system of claim 16, wherein the digital self-interference canceller further comprises an embedded pilot analyzer that detects an embedded pilot in the digital receive signal and analyzes the embedded pilot to determine phase noise data; wherein the digital self-interference canceller adapts the digital transform configuration based on the phase noise data.

18. The system of claim 13, wherein the digital self-interference canceller further comprises an embedded pilot analyzer that detects an embedded pilot in the digital receive signal and analyzes the embedded pilot to determine phase noise data.

19. The system of claim 13, further comprising a secondary transmitter coupled to an output of the digital self-interference canceller and to the analog receive path; wherein the secondary transmitter converts an output of the digital self-interference canceller to a digitally sourced analog self-interference cancellation signal and combines the digitally sourced analog self-interference cancellation signal with the analog receive signal.

20. The system of claim 19, wherein the output is the digital self-interference cancellation signal.

21. The system of claim 13, wherein the analog transmit signal and the analog receive signal have different carrier frequencies; wherein the primary receiver and the secondary receiver share a local oscillator.

* * * * *